(12) United States Patent
Shavit (10) Patent No.: US 11,718,406 B2
(45) Date of Patent: Aug. 8, 2023

(54) COCKPIT OF AN AIRPLANE AND METHOD OF OPERATING AN AIRPLANE

(71) Applicant: ISRAEL AEROSPACE INDUSTRIES LTD., Lod (IL)

(72) Inventor: David Shavit, Karmei Yosef (IL)

(*) Notice: Subject to any disclaimer, the term of this patent is extended or adjusted under 35 U.S.C. 154(b) by 0 days.

(21) Appl. No.: 17/635,868

(22) PCT Filed: Sep. 24, 2020

(86) PCT No.: PCT/IL2020/051051
§ 371 (c)(1),
(2) Date: Feb. 16, 2022

(87) PCT Pub. No.: WO2021/079360
PCT Pub. Date: Apr. 29, 2021

(65) Prior Publication Data
US 2022/0289389 A1 Sep. 15, 2022

(30) Foreign Application Priority Data

Oct. 24, 2019 (IL) .......................................... 270164

(51) Int. Cl.
*B64D 11/06* (2006.01)
*B64D 11/00* (2006.01)

(52) U.S. Cl.
CPC ...... *B64D 11/0689* (2013.01); *B64D 11/0601* (2014.12); *B64D 11/0641* (2014.12); *B64D 2011/0076* (2013.01)

(58) Field of Classification Search
CPC ............ B64D 11/0601; B64D 11/0641; B64D 2011/0076
See application file for complete search history.

(56) References Cited

U.S. PATENT DOCUMENTS 5,028,016 A * 7/1991 Kelvin ............... B64D 11/0015
297/257
7,614,584 B2 11/2009 Retz et al.
(Continued)

FOREIGN PATENT DOCUMENTS

FR 3010974 A1 * 3/2015 ........... B60N 2/4495
FR 3010974 A1 3/2015
(Continued)

*Primary Examiner* — Richard G Davis
(74) *Attorney, Agent, or Firm* — Dorsey & Whitney LLP (57) ABSTRACT

A cockpit for an airplane having, in a plan view, an aft direction, a central longitudinal axis parallel to the aft direction and a rear axis perpendicular to the central longitudinal axis. The cockpit as seen in the plan view comprises: a first seat having a first seating surface with a first seat rear edge passing through an intersection between the longitudinal and rear axes, the first seat being disposed within the cockpit and configured so as to allow a pilot sitting on the first seating surface to perform pre-determined primary pilot functions; and a second seat having a second seating surface with a second seat rear edge. The second seat has: an operational state, in which the second seat is disposed within the cockpit and configured so as to allow operational seating of a pilot on the second seating surface to perform pre-determined secondary pilot functions, the second seat rear edge being at an operational distance from the rear axis; and at least one non-operational state, in which the operational seating of the secondary pilot is disabled, the at least one non-operational state comprising a resting state in which the footprint of the second seat in plan view is longer in at least one dimension than the footprint of the second seat in the operational state, allowing a lying-down position of the secondary pilot.

20 Claims, 4 Drawing Sheets

(56) References Cited

U.S. PATENT DOCUMENTS

| | | | |
|---|---|---|---|
| 9,302,780 B2* | 4/2016 | Zaneboni | B64D 45/00 |
| 10,052,976 B2 | 8/2018 | Atger et al. | |
| 2013/0193732 A1* | 8/2013 | Brand | B60N 2/0745 |
| | | | 297/344.21 |
| 2020/0130837 A1* | 4/2020 | Scoley | B64D 11/00 |

FOREIGN PATENT DOCUMENTS

| | | |
|---|---|---|
| FR | 3015429 A1 | 6/2015 |
| WO | 2017068570 A1 | 4/2017 |

* cited by examiner

COCKPIT OF AN AIRPLANE AND METHOD OF OPERATING AN AIRPLANE

TECHNOLOGICAL FIELD

The present disclosure relates to the cockpit of an airplane and a method of operating an airplane.

BACKGROUND

Conventional air travel can be divided into two groups: air travel by public air transport, such as with flights organized by airlines, and air travel by private transport, such as with executive jets. While the amount of travel by public air transport has seen a large increase in recent years, the amount of travel by executive jet appears to have stagnated. Although executive jets provide advantages such as increased time savings for the passenger, the cost of running such private air transport is prohibitively expensive for many, making more attractive the public air transport due to the cost, despite the significant extra time wasted in travelling in this manner. In particular, for businesspeople with busy schedules and strict time constraints, it would be beneficial for an affordable solution could be provided to allow further time savings when travelling by air.

WO 2017/068570 discloses an aviation method whereby a single pilot can fly an airplane for an inter-continental flight duration, with the aid of a remote pilot during the cruising phase while the single pilot is resting.

GENERAL DESCRIPTION

According to a first aspect of the present disclosure there is provided a cockpit for an airplane having, in a plan view, an aft direction, a central longitudinal axis parallel to the aft direction and a rear axis perpendicular to the central longitudinal axis, the cockpit as seen in the plan view comprising: a first seat having a first seating surface with a first seat rear edge passing through an intersection between the longitudinal and rear axes, the first seat being disposed within the cockpit and configured so as to allow a pilot sitting on the first seating surface to perform pre-determined primary pilot functions; and a second seat having a second seating surface with a second seat rear edge, the second seat having an operational state, in which the second seat is disposed within the cockpit and configured so as to allow operational seating of a pilot on the second seating surface to perform pre-determined secondary pilot functions, the second seat rear edge being at an operational distance from the rear axis; and at least one non-operational state, in which the operational seating of the secondary pilot is disabled, the at least one non-operational state comprising a resting state in which the footprint of the second seat in plan view is longer in at least one dimension than the footprint of the second seat in the operational state, allowing a lying-down position of the secondary pilot.

The airplane can be operable by only a single pilot in the first seat in the operational state using any available systems of the airplane. In an emergency, the airplane can be operable by only a single pilot in the second seat in the operational state using a reduced number of systems. In some embodiments, the single pilot in the second seat in the operational state may not be provided with the capability of direct physical input to the manual flight controls, which may operate via one or more of mechanical or fly-by-wire linkages. In some embodiments, the single pilot in the second seat in the operational state may be provided with the capability of providing navigational orders to the autopilot logic and actuators.

The resting state of the second seat can be configured to allow a level or flat orientation of the seat or an orientation which is so slightly tilted that the position of the secondary pilot thereon can still be considered as a lying-down position, complying with the regulations for providing suitable rest areas for pilots during flight. In other words, in the resting state of the second seat the orientation of its surface configured for lying-down thereon is more horizontal than vertical, i.e. at an angle of less than 45 degrees to an imaginary horizontal orientation of that surface. Exemplary regulations for flight are that no crew member may fly more than "8 hours between required rest periods for a flight crew consisting of two pilots qualified under this part for the operation being conducted" (see Federal Aviation Regulations, Section 135.265(5). Under Section 135.273(a) ibid., "Rest period means the period free of all responsibility for work or duty should the occasion arise." Since the secondary pilot has the possibility to rest during at least a part of the flight, the total flight duration, which is governed by flying time limits of the pilot or pilots, can be essentially increased.

The second seat in its at least one non-operational state can be characterized by a capability of the second seat to take a position, in which the rear edge thereof is in a different position relative to the rear axis than in the operational state; and/or capability of the second seat to have a non-operational configuration different from its operational configuration.

One example of the capability of the second seat to take its different position as mentioned above is that the second seat or at least a portion thereof comprising the rear edge can be capable of being translated in at least one pre-determined direction, rotated about at least one pre-determined axis or a combination thereof. One example of the capability of the second seat to take a non-operational configuration is that the seat can be foldable.

The cockpit can constitute a part of an airplane having a door area disposed adjacent the cockpit. In this case, the second seat can have at least two non-operational states, in one of which the second seat can be positioned so as to allow full access to the door area; and the other one, i.e. in the resting state, it can extend across at least a portion of the door area in the direction parallel to the central longitudinal axis thereby restricting access at least to that portion. The former non-operational state will be further referred to as the 'removed-seat' state.

The above door of the airplane can be its main door, and possibly the only door, which can be used for boarding and alighting of passengers and/or as an emergency exit. Since in the removed-seat state the second seat is positioned so as to allow full access to the door area, passengers can easily board and alight, and a speedy emergency evacuation can take place. Since in the resting state, the second seat can extend across at least a portion of the door area, use can be made of space which would otherwise not be used, thus increasing efficiency of space usage within the airplane.

In an alternative arrangement, in the resting state, the second seat can allow partial or full access to the door area.

In the operational state, the second seat can be disposed so as to at least partially restrict access to the door area. This arrangement can allow use to be made of space which would otherwise not be used, thus increasing efficiency of space usage within the airplane.

In the operational state, the second seat can be configured to have an upright configuration, allowing supporting the secondary pilot while he is operationally seated.

In the resting state, the second seat can be configured to have a configuration allowing a lying-down position of the secondary pilot.

The length of the footprint of the second seat in plan view in the resting state thereof in the at least one dimension can be at least 180 cm. Such a length can be sufficient to allow a pilot to be supported at rest. The length can be at least 190 cm, more particularly, at least 197 cm.

The cockpit can comprise an extendable and retractable partition for at least partially surrounding the second seat when in the resting state. Such a partition can provide screening of the second seat from at least some light and/or noise when the second seat is in the resting state, so as to facilitate resting of a pilot on the seat.

The cockpit can comprise: a primary man-machine interface disposed so as to allow the primary pilot to perform the primary pilot functions; and a secondary man-machine interface disposed so as to allow the secondary pilot to perform the secondary pilot functions, when the second seat is its operational state, the secondary man-machine interface being spaced from the primary man-machine interface in the aft direction and in a direction parallel to the rear axis.

At least a portion of the primary man-machine interface can be visible to the secondary pilot when sitting on the second seat in its operational state.

Any one or each of the man-machine interfaces can be in the form of a screen or monitor, which has an interface for user input by the pilot. For example, it can comprise one or more touch-sensitive screens such as a touch-screen panel. When at least a portion of the primary man-machine interface is configured to be visible to the secondary pilot when operationally seated (i.e. when sitting on the second seat in its operational state), the secondary man-machine interface can be smaller or reduced in size compared to the primary man-machine interface.

The second seat can comprise an extendable portion configured to protrude from a front edge of its seating surface in the plan view of the cockpit, in the resting state of the second seat, so as to at least partially support the secondary pilot's legs. The extendable portion can further be configured for being located beneath a side console of the cockpit, when the extendable portion is extended. This can allow making use of the otherwise unused space beneath the side console for the legs of the secondary pilot, thus increasing efficiency of space usage within the airplane.

The cockpit can comprise a side console, and a leg support structure may be disposed at least partially beneath the side console of the cockpit, so as to at least partially support the secondary pilot's legs at least in the resting non-operational state of the second seat.

The leg support structure can be in the form of a foldable, retractable, movable or fixed structure. Such a leg support structure can allow making use of the otherwise unused space beneath the side console for the legs of the secondary pilot, thus increasing efficiency of space usage within the airplane.

In the resting non-operational state of the second seat, a portion of the second seat can be configured to be in a position further forward compared to the rear axis than the same portion of the second seat in the operational state of the second seat.

The secondary man-machine interface can be operative in the operational state of the second seat and at least partially inoperative in the at least one non-operational state of the second seat. Such an arrangement can prevent accidental operation of the second man-machine interface by a secondary pilot while he is not expected to operate, i.e. while he is resting, bringing or getting up in order to bring the second seat into one of its non-operational states.

Both the primary and secondary man-machine interfaces can be configured for being inoperative at a time at which both primary and secondary pilots have left their seats, for example, while the primary pilot and secondary pilot exchange places so that the previous primary pilot takes on the role of secondary pilot and can rest, and the previous secondary pilot takes on the role of primary pilot. Such an arrangement can prevent accidental operation of the second man-machine interface while exchanging places.

The primary man-machine interface can allow the primary pilot to have complete control of the airplane flight, and the secondary man machine interface can allow the secondary pilot to have partial control of the airplane flight, the partial control being less complete than the complete control provided to the primary pilot.

The primary pilot functions can comprise monitoring, controlling, manual flight and autopilot flight functions, and the secondary pilot functions can comprise at least one of monitoring, controlling and autopilot flight functions.

The primary pilot can be provided with manual controls in addition to the man-machine interface in order to facilitate manual flight control of the airplane.

In an alternative embodiment, the secondary man-machine interface can allow the secondary pilot to have complete control of the airplane flight. The secondary pilot functions can comprise monitoring, controlling, manual flight and autopilot flight functions. The secondary pilot can be provided with manual controls in addition to the man-machine interface in order to facilitate manual flight control of the airplane.

According to a second aspect of the present disclosure, there is provided a method of operating a commercial airplane having a first pilot seat being the only pilot seat from which the airplane is operable by a single pilot seated therein and a second pilot seat being the only pilot seat capable of having a non-operational state during flight, the airplane being operable by a single pilot in the first pilot seat, the method comprising: providing a possibility for one of two pilots to be seated in the first pilot seat in said primary pilot operational state and for the other one of the two pilots to be simultaneously seated in the second pilot seat in a secondary pilot operational seated state; performing a take-off and climbing portion of the airplane operation until a Top Of Climb (TOC) position is reached with the pilots in the first and second pilot seats in the respective primary and secondary pilot operational seated states; providing a possibility, when one of the pilots is in the first pilot seat in the primary pilot operational seated state, for the other of the pilots to convert the second pilot seat from the secondary pilot operational seated state to a secondary pilot non-operational state, the secondary pilot non-operational state being a resting state; performing at least a part of cruising at altitude between the TOC position and a Top of Descent (TOD) position, with one of the pilots being in the second pilot seat in the secondary pilot non-operational state, all the states being in such mutual disposition as to allow the pilots to exchange their seats and thus to allow the pilot who is not in the first pilot seat in the primary operational seated state to rest; and performing a descending and landing portion of the airplane operation from the TOD position with the pilots in the first and second pilot seats in the respective primary and secondary pilot operational seated states.

Since the takeoff and climbing, and descending and landing are high risk operations, performing both of these steps with both pilots seated in respective primary and secondary pilot operational seated states can increase the safety of the airplane. Further, since the cruising step generally has a much lower risk, it is relatively safe, and can be more efficient for single-pilot operation by one of the pilots while the other pilot rests, so as to conserve pilot flight hours which are limited for each pilot according to the above mentioned regulations.

By exchanging seats, both pilots can get an opportunity to rest and so the time efficiency is improved since the overall flight duration can be greater while still abiding by the pilot flight hours limit regulations.

The method can comprise operating the airplane using autopilot control at least during the time of exchanging seats.

This increases the safety while places are being exchanged. Further, any controls for the pilot in the first seat and/or the pilot in the second seat can be locked or made inoperative while exchange is taking place to prevent inadvertent and undesirable commands being sent to any airplane system accidentally.

During the taking off and climbing step and the descending and landing step, the pilots can be seated in the first and second pilot seats in an offset forward and aft position, with the forwardly offset first pilot seat located along a central longitudinal axis of a cockpit of the airplane and the aftwardly offset second pilot seat being located to the side of and offset aftwardly of the forwardly offset first pilot seat.

In the operational seated states, the pilot in the first pilot seat can have primary pilot functions, and the pilot in the second pilot seat can have secondary pilot functions which can be fewer than the primary pilot functions; optionally wherein the primary pilot functions comprise monitoring, controlling, manual flight and autopilot flight functions, and wherein the secondary pilot functions comprise at least one of monitoring, controlling and autopilot flight functions.

The method can comprise using the cockpit according to the first aspect of the present disclosure.

The airplane can be configured to have a flight plan flight time of above 8 hours, optionally above 10 hours.

The total time during which any one of the two pilots are seated in any of the first and second pilot seats in a respective primary or secondary pilot operational state during the flight time can be less than or equal to 8 hours. By "during the flight time", what is meant is the total mission time, including the pre-flight and post-flight checklists.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying drawings, in which.

DETAILED DESCRIPTION OF EMBODIMENTS

The present Applicant has realised that by making a small airplane more efficient, such airplane can become capable of long intercontinental flight for sufficient duration to be a viable option for executive commercial business travel, and thus the cost per nautical mile of executive commercial business jets can be greatly reduced. With this realisation, executive private jet travel can be opened up to a greater number of people and much time saving can be achieved.

The efficiency of a small airplane can be attributed, among other factors, to the regulations governing the length of time during which pilots are permitted to fly a commercial airplane. Thus, by providing a small airplane with the possibility of accommodating two pilots and allowing one of them to rest during the operation of the airplane by the other one, the efficiency of the airplane can be increased drastically.

Reference in the specific examples below to primary and secondary pilots refers not to a specific one of the two pilots throughout the entire duration of the flight. Instead, "primary pilot" refers to the pilot who happens to be carrying out the function of the pilot in the first seat at that particular time during the flight and "secondary pilot" refers to the pilot who happens to be carrying out the function of the pilot in in the second seat at that particular time during the flight.

Figure 1:
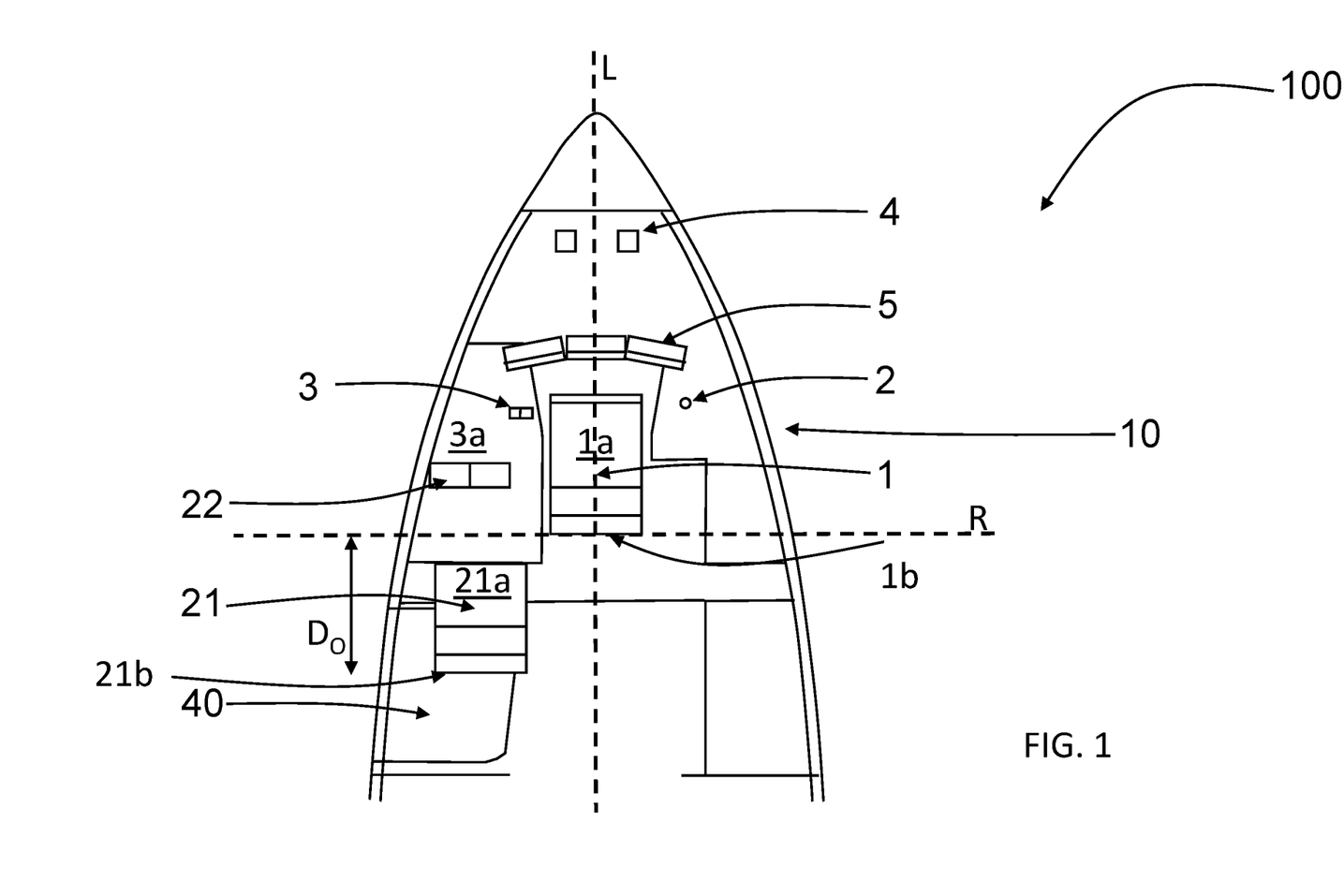
FIG. 1 shows a plan view of a portion of an airplane with a cockpit according to one example of the present disclosure.

FIG. 1 shows one example of a cockpit provided with the above possibility. In this example, a cockpit designated as 10 constitutes a part of an airplane 100, and comprises a first seat 1 in an operational state, or primary pilot operational seated state, disposed within the cockpit 10, having a seating surface 1*a* and a rear edge 1*b*. The rear edge 1*b* passes through an intersection between a central longitudinal axis L and a rear axis R. The first seat is for seating of a primary pilot, or Pilot in Command (PIC) who is provided with complete control of the airplane, i.e. has the capability of monitoring, controlling airplane systems, flying the airplane using autopilot and flying the airplane using manual controls. For the last of these, there are provided for use by the primary pilot a steering stick 2, throttles 3 located on a side console 3*a* and steering pedals 4. A space between the side console 3*a* and the cockpit's floor is free. There are also provided a primary Man-Machine-Interface MMI for the primary pilot, in the form of three panels 5, arranged in a row, such that there is a central panel, a left panel and a right panel. The panels 5 can be touch-screen panels.

In the described example, a second seat 21 is provided for a secondary pilot, and comprises a second seating surface 21*a* and a rear edge 21*b*. In FIG. 1, the second seat 21 is shown in an operational state, or secondary pilot operational seated state, in which the second seat 21 is disposed within the cockpit 10 and configured so as to allow operational seating of a secondary pilot on the second seating surface to perform pre-determined secondary pilot functions. In this arrangement, the second seat rear edge 21b is at an operational distance $D_O$ from the rear axis R.

The secondary pilot differs from the primary pilot, in that the secondary pilot is provided with partial control of the airplane, i.e. has the capability of monitoring, controlling airplane systems and flying the airplane using autopilot. He is not provided with the controls to fly the airplane manually. There is provided a secondary Man-Machine-Interface MMI for the secondary pilot, in the form of two panels 22, arranged side-by-side, such that there is a left panel and a right panel. The panels 22 can be touch-screen panels. The secondary pilot can be able to see the left-hand panel 5 of the primary MMI. The secondary pilot can utilize those panels of the primary MMI visible to him in order to perform his predetermined functions as secondary pilot.

The airplane 100 comprises a door area 40 disposed adjacent the cockpit 10, which, when an access thereto from the interior of the airplane is not restricted, can allow boarding and alighting of the crew and passengers, and can additionally or alternatively provide an emergency exit route from the airplane 100. As shown in FIG. 1, the second seat 21 partially restricts access to the door when in the operational state.

Figure 2A:
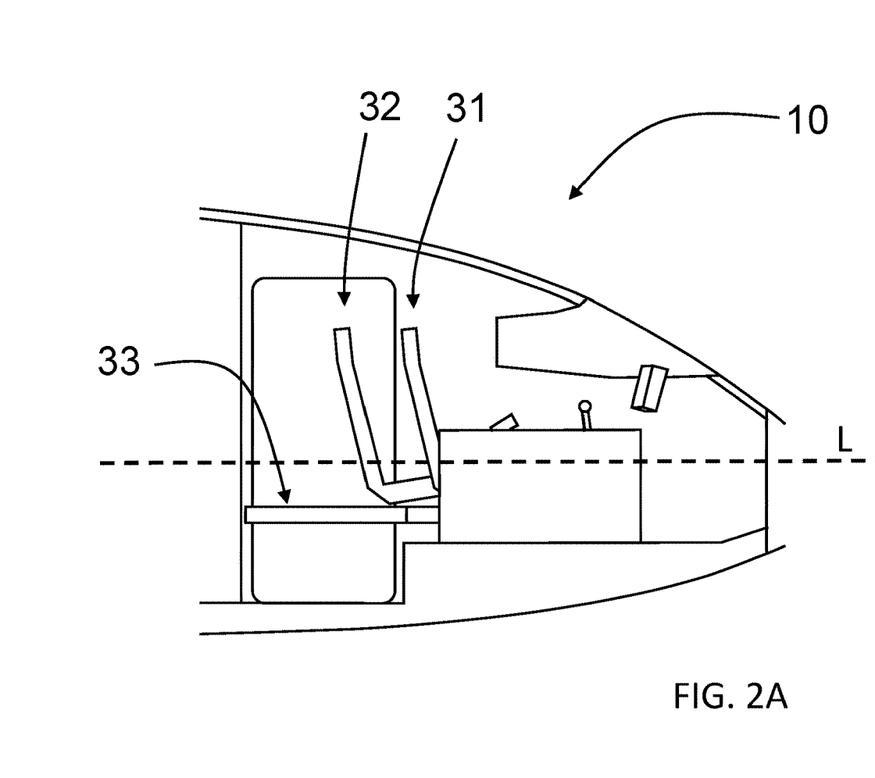
FIG. 2A shows a side view of the portion of the airplane shown in FIG. 1.

With reference to FIG. 2A, various states of the second seat 21 are shown. State 32 is the operating state of the second seat 21. This position can be used from the airplane start until reaching the TOC (Top of Climb) or from TOD (Top of Descent) to parking stop, allowing both primary and secondary pilots to be operationally seated and operational. In this way, the secondary pilot is able to monitor the primary pilot and support the flight activity. In order to allow the evacuation of a plane in distress, the layout of the seat 32, its location and the width of the door in the door area 40 will enable a reasonable exit from the plane even if the seat is stuck in this position 32.

As shown in FIG. 2A, in the operational state 32, the second seat 21 is configured to have an upright configuration, allowing a seated position of the secondary pilot.

States 31 and 33 constitute non-operational states of the second seat 21, in which the operational seating of the secondary pilot is disabled. Non-operational state 33 is a resting state of the second seat 21, in which the footprint of the second seat 33 in plan view is longer in at least one dimension than the footprint of the second seat in the operational state 32, allowing a lying-down position of the secondary pilot. As can be seen in FIG. 2A, the footprint of the second seat in the resting state 33 is elongated in a direction parallel to the central longitudinal axis L of the cockpit 10 and airplane, when viewed in plan view, compared to when the second seat is in the secondary pilot operational seated state 32.

In the resting state 33, the second seat 21 can be positioned such that the rear edge of its seating surface is in a different position relative to the rear axis than in the operational state. Additionally or alternatively, the second seat 21 can have a resting configuration which is different from its operational configuration, in that the second seat allows a secondary pilot to lie down. This can be achieved by virtue of the second seat being capable of providing a horizontal surface as shown in FIG. 2A, or a tilted or angled surface of less than 45 degrees to the horizontal.

In the resting state 33, the second seat 21 extends across at least a portion of the door area 40 in the direction parallel to the central longitudinal axis thereby restricting access to the door area 40. This allows the secondary pilot to make maximum use of the space of the door area 40 when it is not in use.

Figure 2B:
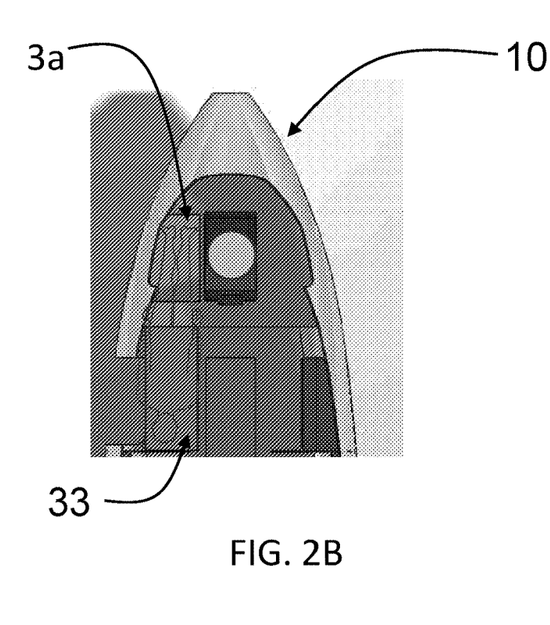
FIG. 2B shows a plan view of a portion of an airplane with a cockpit similar to that shown in FIGS. 1 and 2, with a second seat in a resting state.

In the resting state 33, as shown in FIG. 2B, the second seat 21 is configured to extend into the space under the side console 3a so that a secondary pilot who is resting, or lying down, can place his feet under the side-console 3a, thereby allowing a greater length of space in which the secondary pilot can rest. This length of resting space for the secondary pilot can be at least 180 cm, optionally at least 190 cm and further optionally at least 197 cm long.

The extension of the second seat 21 in its resting state into the space under the side console 3a, can be achieved in a number of ways. In a first arrangement, the second seat can comprise an extendable portion configured in the resting state 33 of the second seat to protrude from a front edge of its seating surface 21a in the plan view of the cockpit 10, so as to at least partially protrude into the space under the side console 3a. In a second arrangement, there can be provided a leg support structure configured to be disposed or built at least partially beneath the side console of the cockpit, so as to at least partially support the secondary pilot's legs in the resting state of the second seat. The leg-support structure can comprise a foldable and/or extendable support, which can be an expandable and retractable portion of the side-console 3a or cockpit 10, can be a fixed portion of the side console 3a or cockpit 10, and/or can comprise a moving support, such as a stool, bench or other arrangement.

In any of the above cases, effectively, in the resting state 33 of the second seat 21, a portion of the second seat 21 is configured to be in a position further forward compared to the rear axis R than the same portion of the second seat 21 in the operational state 32 of the second seat. Thus the effective length, i.e. length of the footprint in plan view, of the second seat in the resting state 33 can be constituted by the length of the second seat 21 and the length of the support provided for the legs of the secondary pilot, and any gap therebetween, irrespective of whether it is an integral part of, or additional to, the second seat.

Non-operational state 31 of the second seat 21, shown in FIG. 2A, constitutes the state in which the second seat has been repositioned so as to provide at least partial access to the door area 40. In the present example, this is achieved by the second seat 21 having been moved forwards so that the rear edge of its seating surface has taken a different position relative to the rear axis than in the operational state 32 of the seat, thereby allowing full access to the door area 40. This non-operational state can be referred to as the 'removed-seat' state. Although this is shown, it is also envisaged that alternatively or in addition, the second seat 21 in the removed-seat state 31 can be folded or repositioned in any direction or configuration (compared to the operational state 32) which allows full access to the door area 40. Non-operational or removed-seat state 31 of the second seat 21 can be used when passengers board and alight from the airplane 100 via the door area 40, and also in emergencies when full access to the door area 40 needs to be provided. In the secondary pilot non-operational state 31, the second seat does not interfere with passage through the door area 40 and the door.

Figure 3A:
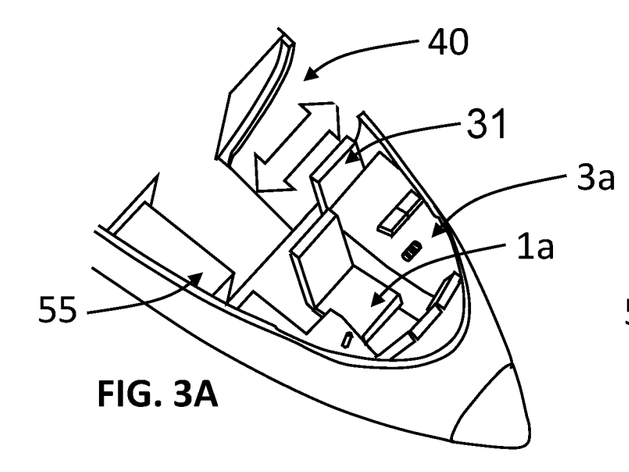
FIG. 3A shows a top perspective view of the cockpit shown in FIG. 2B, with the second seat in a removed-seat state.
Figure 3B:
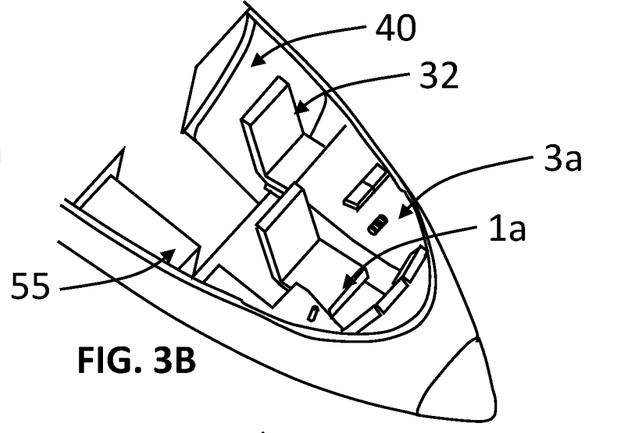
FIG. 3B shows a top perspective view of the cockpit shown in FIG. 2B, with the second seat in an operational state.

FIGS. 3A-3D depicts the various states of the second seat 21 in the cockpit 10. FIG. 3A shows the removed-seat state 31 of the seat 21, in which the seat 21 is moved forwards to allow full access to the door area 40. This allows entry and exit via the door area 40, and can be used while the airplane 100 is on the ground and/or in emergencies. FIG. 3B shows the secondary pilot operational seated state 32 for operational seating of the secondary pilot, in which the seat 21 restricts access to the door area 40 as described above. Operational state 32 allows the secondary pilot to be operational in addition to the primary pilot, and can be used in the critical stages of flight, i.e. takeoff and climbing until the Top Of Climb, TOC, position and during descent and landing from the Top Of Descent, TOD, position. Additionally, in the operational state 32, or indeed, in the removed-seat state 31 depicted in FIG. 3A, the secondary pilot, i.e. the pilot who is not the primary pilot, can choose not to be located in the second seat 21, but can instead choose to prepare and serve meals to airplane passengers using the galley 55.

Figure 3C:
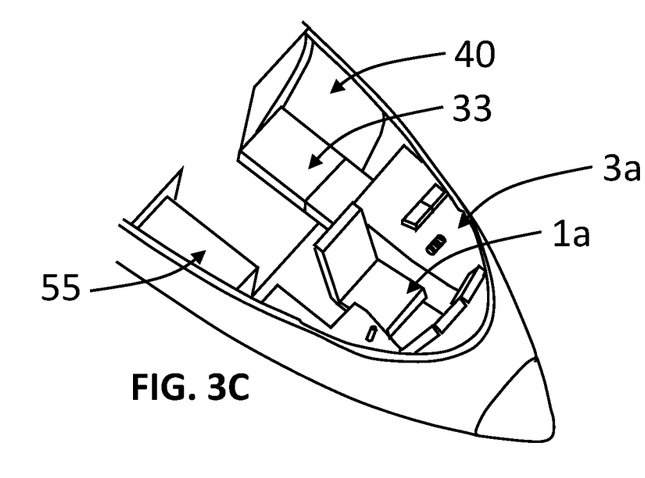
FIG. 3C shows a top perspective view of the cockpit shown in FIG. 2B, with the second seat in the resting state.
Figure 3D:
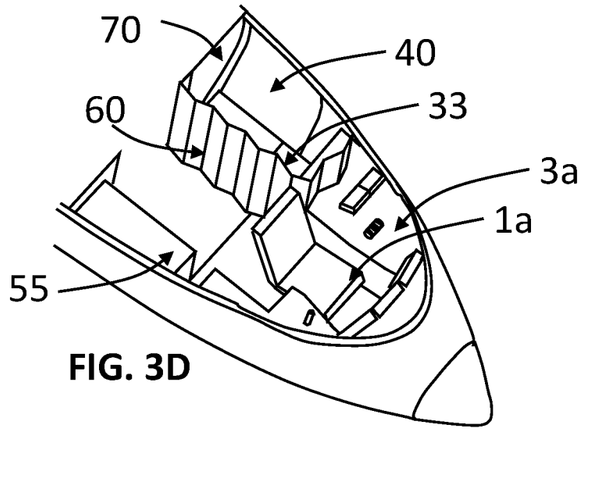
FIG. 3D shows a top perspective view of a cockpit for an airplane similar to the cockpit shown in FIGS. 1 to 3C, with a second seat in a resting state, partially surrounded by a partition.

FIG. 3C depicts a resting state 33, with the second seat 21 being in a horizontal, flat position. In this position, as shown in FIG. 3D, there can be provided an extendable and retractable partition, e.g. in the form of a curtain 60 for at least partially surrounding the second seat when in the resting state. In addition or alternatively, a partition wall 70 of a cabin of the airplane 100 can aid in providing at least a part of a partition. Such a partition can help to isolate a resting pilot, in accordance with required standards, in that the partition can reduce or prevent penetration of light and/or noise which can otherwise distract the pilot who is trying to rest.

Although not shown, the secondary pilot, when seated in the second seat 21 in the secondary pilot operational seated state 32, can be at the same level relative to the floor level as the primary pilot. Alternatively, the second seat 21 can be lower than the first seat 1 relative to the floor level, due to factors such as necessity for space, and/or the curl of the side of the cabin and/or cockpit where the second seat is located. In some cases, the cabin floor can be lower than the cockpit floor as is common in small airplanes.

In the above arrangements, the first seat 1 for the primary pilot is positioned further forward towards the nose of the airplane than the second seat 21, and further forward towards the nose of the airplane than in a conventional two-pilot airplane, and in a narrower area of the forward fuselage than the second seat 21. This allows the start of the cabin, i.e. the portion generally accessible to, and utilized by, passengers and cargo in the airplane, to be positioned further forward than in a standard two-pilot airplane. The result of this is a shorter forward fuselage and thus reduced weight, drag, cockpit volume and cabin volume. When the second seat 21 is in its secondary pilot operational seated state, the primary and secondary pilots when positioned in the seats are generally positioned in the cockpit 10 and forward cabin area in flight, while the second seat 21 for the secondary pilot, when unoccupied, i.e. in the removed-seat position 31, does not need to protrude into the forward cabin area.

Apart from the space efficiencies provided by the above compact configuration, as well as the first seat 1 of the primary pilot being located centrally in the cockpit 10 so as to make the airplane 100 suitable for single-pilot flight, the above configuration also provides certain efficiencies and savings in terms of a method of operation which will now be described with reference to FIG. 4.

Figure 4:
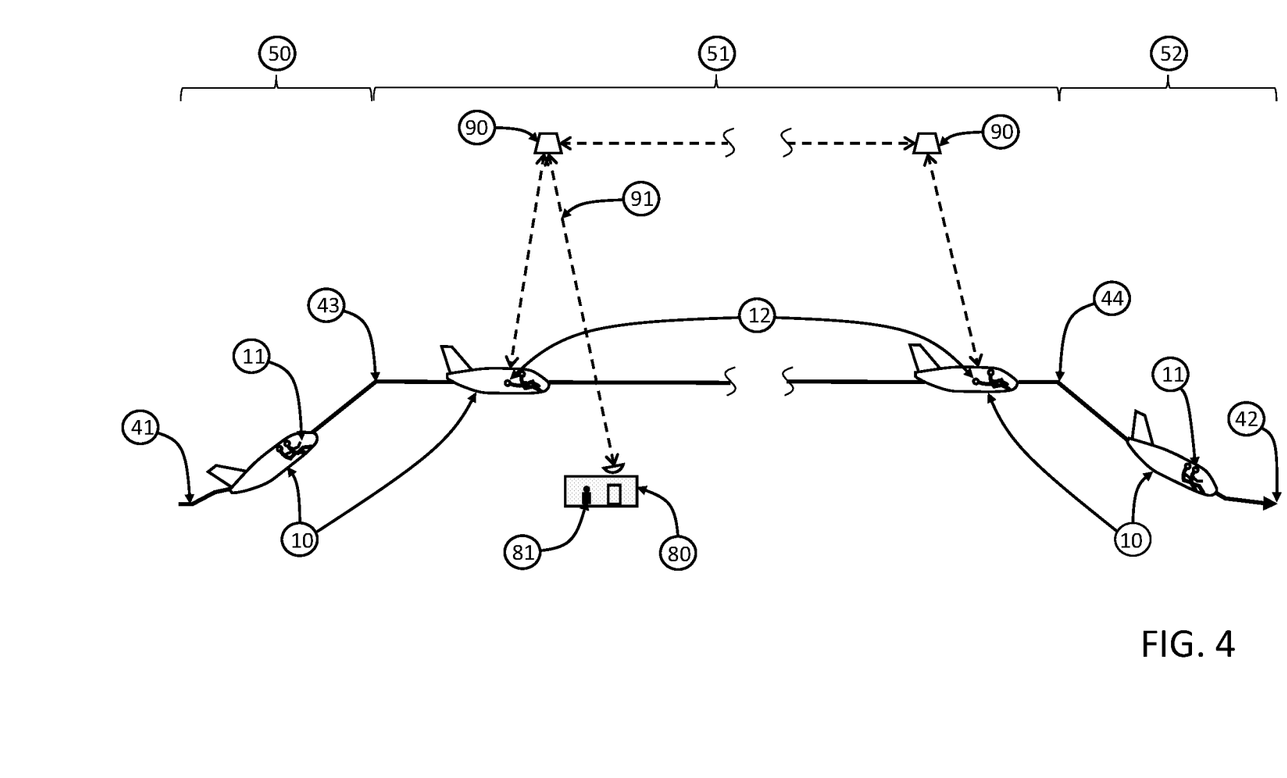
FIG. 4 shows schematically a method for operating an airplane over the course of a flight.

As shown in FIG. 4, a standard flight can be divided into three phases. A first phase 50 begins with takeoff 41 and climbs until the TOC 43. A second phase 51 is a cruising phase between the TOC 43 and a TOD 44. A third phase 52 is a descent and landing phase, between the TOD 44 and landing 42. Landing 42 can include bringing the airplane 100 to a halt and/or parking the airplane 100. As indicated by reference 11 in both the first and third phases 50, 52, which are critical stages of flight, both primary and secondary pilots are operationally seated in the first and second pilot seats in operationally seated states, to allow the secondary pilot to support the primary pilot in piloting functions.

In the second phase 51, which is a less-critical phase, the risks and workload of the primary pilot are substantially lower so that a single pilot flight does not constitute a risk. Therefore, as indicated by reference 12, the airplane is flown by a single pilot in the second phase 51, namely the primary pilot, while the secondary pilot rests. The pilots can change roles by exchanging seats, for example every 2-4 hours depending on their preferences. This arrangement saves, and reduces wastage of, some of the flight hours (out of the eight-hour limit) of the resting pilot and thus gives the crew overall more time to fly the airplane. Thus the flight time of the airplane 100 can have a duration of above 8 hours, optionally above 10 hours, while the total time during which any one of the two pilots are in an operational state during the flight time can be less than or equal to 8 hours. By "during the flight time", what is meant is the total mission time, including the pre-flight and post-flight checklists. On long flights, the second phase 51 constitutes the base of the flight time (80-90%) and therefore this method of operation arrangement allows for 70%-80% increase in dual pilot flight time.

While the pilots are exchanging positions or seats, the airplane can be put under autopilot flight control. Further, the MMI of one or both of the pilots can be made inoperative, e.g. locked, to prevent inadvertent undesirable commands being given to any one or more systems of the airplane.

During the second phase 51 in which the secondary pilot rests while the primary pilot controls the airplane, flight support can be provided to the primary pilot in one or more of the following ways. Firstly, in a situation of distress and especially in severe distress, the secondary pilot will convert the second seat from the resting non-operational state to the secondary pilot operational seated state to perform his functions as secondary pilot, until the situation ends or landing occurs. Secondly, in such situations and even in situations of no-distress in order to improve safety, a remote pilot 81 can monitor the airplane from a ground station 80. The remote pilot 81 can connect to the airplane, i.e. can be in data communication, via, e.g., satellite communication 90, 91 or the like which allows the remote pilot 81 to track the plane from the ground station 80. The remote pilot 81 can provide support to one or more of the primary and secondary pilots from the ground.

In the above-described method, there is a greater level of safety over the flight duration compared to single-piloted airplanes, due to both pilots operating the airplane during critical phases of flight, but without requiring both pilots to completely control the airplane, and while allowing more efficient use of time during the safer phases of flight.

The above-described cockpit enables a more optimal seat for a single pilot flight by positioning the first pilot seat for the primary pilot centrally in a port-starboard, or left-right, direction, which allows an improved field of vision compared to the pilot seat on one side, namely the left (as is customary in cockpits today), which makes the right field of vision difficult.

Further, the above-described cockpit and method enable two pilots to fly a commercial flight for up to 10-15 hours without exceeding the 8-hour flight limit per pilot as set out by the regulations, and enables safety similar to that of a two-pilot team, with only a single pilot required for the controls at times.

The invention claimed is:

1. A cockpit for an airplane having, in a plan view, an aft direction, a central longitudinal axis parallel to the aft direction and a rear axis perpendicular to the central longitudinal axis, the cockpit comprising a main door of the airplane, and as seen in the plan view comprising:
- a first seat having a first seating surface with a first seat rear edge passing through an intersection between the longitudinal and rear axes, the first seat being disposed within the cockpit and configured so as to allow a pilot sitting on the first seating surface to perform pre-determined primary pilot functions; and
- a second seat having a second seating surface with a second seat rear edge, the second seat having:
- an operational state, in which the second seat is disposed within the cockpit and configured so as to allow operational seating of a pilot on the second seating surface to perform pre-determined secondary pilot functions, the second seat rear edge being at an operational distance from the rear axis, in said operational state access to the main door is at least partially restricted; and
- a first non-operational state, in which the second seat is positioned so as to allow greater access to the main door than in said operational state; and
- a second non-operational state, in which the operational seating of the secondary pilot is disabled, the second non-operational state being a resting non-operational state in which the footprint of the second seat in plan view is longer in at least one dimension than the footprint of the second seat in the operational state, allowing a lying-down position of the secondary pilot, wherein in the resting non-operational state, the second seat extends across at least a portion of the main door in the direction parallel to the central longitudinal axis thereby at least partially restricting access thereto.

2. The cockpit according to claim 1, wherein the second seat in at least one of the first non-operational seat or the second non-operational state is characterized by at least one of the following:
- changing the position of the second seat, such that the rear edge is in a different position relative to the rear axis than in the operational state; or
- a non-operational configuration of the second seat different from its operational configuration.

3. The cockpit according to claim 1, wherein in the operational state, the second seat is disposed so as to at least partially restrict access to the main door area.

4. The cockpit according to claim 1, wherein in the operational state, the second seat is configured to have an upright configuration, allowing a seated position of the secondary pilot.

5. The cockpit according to claim 1, wherein in the resting non-operational state, the second seat is configured to have a configuration allowing a lying-down position of the secondary pilot.

6. The cockpit according to claim 1, wherein the length of the footprint of the second seat in the at least one dimension is at least 180 cm.

7. The cockpit according to claim 6, further comprising an extendable and retractable partition for at least partially surrounding the second seat when in the resting non-operational state.

8. The cockpit according to claim 1, further comprising:
- a primary man-machine interface disposed so as to allow the primary pilot to perform the primary pilot functions; and
- a secondary man-machine interface disposed so as to allow the secondary pilot to perform the secondary pilot functions, when the second seat is its operational state, the secondary man-machine interface being spaced from the primary man-machine interface in the aft direction and in a direction parallel to the rear axis;
- optionally wherein at least a portion of the primary man-machine interface is visible to the secondary pilot when operationally seated.

9. The cockpit according to claim 8, wherein the second seat comprises an extendable portion configured in the resting non-operational state of the second seat to protrude from a front edge of its seating surface in the plan view of the cockpit, so as to at least partially support the secondary pilot's legs, and wherein optionally, the extendable portion is configured for being located beneath a side console of the cockpit, when the extendable portion is extended.

10. The cockpit according to claim 8, further comprising a side console of the cockpit and a leg support structure disposed at least partially beneath the side console of the cockpit, so as to at least partially support the secondary pilot's legs at least in the resting non-operational state of the second seat.

11. The cockpit according to claim 1, wherein in the resting non-operational state of the second seat, a portion of the second seat is configured to be in a position further forward compared to the rear axis than the same portion of the second seat in the operational state of the second seat.

12. The cockpit according to claim 8, wherein the secondary man machine interface is operative in the operational state of the second seat and at least partially inoperative in the at least one non-operational state of the second seat.

13. The cockpit according to claim 9, wherein the primary man-machine interface allows the primary pilot to have complete control of the airplane flight, and wherein the secondary man machine interface allows the secondary pilot to have partial control of the airplane flight, the partial control being less complete than the complete control provided to the primary pilot.

14. The cockpit according to claim 1, wherein the primary pilot functions comprise monitoring, controlling, manual flight and autopilot flight functions, and wherein the secondary pilot functions comprise at least one of monitoring, controlling and autopilot flight functions.

15. A method of operating a commercial airplane having a first pilot seat being the only pilot seat from which all of the airplane systems are operable by a single pilot seated therein and a second pilot seat being the only pilot seat capable of having a non-operational state during flight, the airplane being operable by a single pilot in the first pilot seat, the method comprising:
- providing a possibility for one of two pilots to be seated in the first pilot seat in said primary pilot operational state and for the other one of the two pilots to be simultaneously seated in the second pilot seat in a secondary pilot operational seated state;
- performing a takeoff and climbing portion of the airplane operation until a Top Of Climb (TOC) position is reached with the pilots in the first and second pilot seats in the respective primary and secondary pilot operational seated states;
- providing a possibility, when one of the pilots is in the first pilot seat in the primary pilot operational seated state, for the other of the pilots to convert the second pilot seat from the secondary pilot operational seated state to at least one of a secondary pilot first non-operational state allowing a full access to a main door area of the airplane and a secondary pilot second non-operational state restricting access to the main door area of the airplane, the secondary pilot non-operational state being a resting state;

performing at least a part of cruising at altitude between the TOC position and a Top of Descent (TOD) position, with one of the pilots being in the second pilot seat in the secondary pilot non-operational state, all the states being in such mutual disposition as to allow the pilots to exchange their seats and thus to allow the pilot who is not in the first pilot seat in the primary operational seated state to rest; and performing a descending and landing portion of the airplane operation from the TOD position with the pilots in the first and second pilot seats in the respective primary and secondary pilot operational seated states.

16. The method according to claim 15, further comprising operating the airplane using autopilot control at least during the time of exchanging seats.

17. The method according to claim 15, wherein during the taking off and climbing step and the descending and landing step, the pilots are seated in the first and second pilot seats in an offset forward and aft position, with the forwardly offset first pilot seat located along a central longitudinal axis of a cockpit of the airplane and the aftwardly offset second pilot seat being located to the side of and offset aftwardly of the forwardly offset first pilot seat.

18. The method according to claim 15, wherein, in the operational seated states, the pilot in the first pilot seat has primary pilot functions, and the pilot in the second pilot seat has secondary pilot functions which are fewer than the primary pilot functions;

optionally wherein the primary pilot functions comprise monitoring, controlling, manual flight and autopilot flight functions, and wherein the secondary pilot functions comprise at least one of monitoring, controlling and autopilot flight functions.

19. The method according to claim 15, using the cockpit according to claim 1.

20. The method according to claim 15, wherein the airplane is configured to have a flight plan flight time of above 8 hours, optionally above 10 hours.

* * * * *